United States Patent

Hayakawa et al.

[15] 3,652,829

[45] Mar. 28, 1972

[54] DISCRIMINATION CARD FOR CARD READER

[72] Inventors: Ken Hayakawa, Yokohama; Mitsuaki Tamada, Sagamihara, both of Japan

[73] Assignee: Tokico Ltd., Kawasaki-Kanagawa-Ken, Japan

[22] Filed: July 2, 1970

[21] Appl. No.: 51,774

[30] Foreign Application Priority Data

July 3, 1969 Japan....................................44/52942
Oct. 18, 1969 Japan....................................44/99288

[52] U.S. Cl...........................................................235/61.12 M
[51] Int. Cl...........................................................G06k 19/04
[58] Field of Search..................................235/61.12; 200/46

[56] References Cited

UNITED STATES PATENTS

| | | | |
|---|---|---|---|
| 2,673,033 | 3/1954 | Gruver | 235/61.9 R |
| 2,536,155 | 1/1951 | Brand | 235/61.12 R |
| 3,399,473 | 9/1968 | Jaffe | 235/61.12 N |
| 3,275,806 | 9/1966 | Quinn et al. | 235/61.12 R |
| 3,436,736 | 4/1969 | Platt et al. | 340/172.5 |
| 3,558,859 | 1/1971 | Dilsner | 235/61.12 N |

*Primary Examiner*—Daryl W. Cook
*Attorney*—Waters, Roditi, Schwartz & Nissen

[57] ABSTRACT

A discrimination card for card reader has plural and different information codes incorporated therein. The information codes can be variably and desirably set up in one card. The discrimination card cooperates with a single card reader which is capable of reading each information code and has a single card insertion slot.

5 Claims, 10 Drawing Figures

DISCRIMINATION CARD FOR CARD READER

This invention relates to a discrimination card for card reader, and more particularly to a discrimination card cooperating with a card reader having a single card insertion slot.

Heretofore, a card system in use of discrimination cards and card readers for fuel supply control has been provided in a fuel supply apparatus for feeding fuel from a fuel reservoir to a tank lorry, for example. When this fuel supply apparatus is operated in practice, is is required to input a plurality of informations including sort and quantity of fuel, number of a tank lorry, etc., in the fuel supply systems of the apparatus.

In the conventional fuel supply system, it has been an usual practice to provide individual card readers respectively in a plural number of systems respectively feeding different fuel. Then the cards are prepared and kept in a controlling or guard room such as in a shipping or loading yard. An operator or driver would tell his car number, the sort and quantity of fuel to be supplied in the tank lorry card to a controller or guard man and receive three appropriate cards for the fuel supply. Before starting the fuel supply, these three cards are inserted by turns respectively in the card readers. By provision of card readers individually in each fuel supply system of the fuel supply apparatus, the cost for the fuel supply apparatus is increased. And the provision requires many installation places and further necessity of operation of individually located card readers by a plurality of cards when it is needed to simultaneously or consecutively actuate plural fuel supply systems. This causes much complexities and errors during operation.

For meeting this circumstance a fuel supply apparatus has been already proposed and applied for by the present inventors. The apparatus has attempted to overcome the above-mentioned disadvantages by means of a device to control a plurality of fuel supply systems in use of a card reader having a single card insertion slot. This card reader contains card code reading parts adapted for a plural number of systems. The discrimination card to be inserted into this card insertion slot has plural kinds of information card codes in a body as one card.

The card used in such apparatus as described above has incorporated informations of plural varieties such as fuel sort, fuel quantity, number of a tank lorry and the like in one card. The card is a non-separable card. The fuel sort, for instance, comprises the sorts of crude oil, heavy oil and light oil, etc. The fuel quantity includes at least the sorts of 1 kl., 2 kl., 3 kl. and 4 kl., etc. in case a fixed quantity of fuel is supplied. The tank lorry numbers cover the number of tank lorries as much as used for the fuel supply. In consequence, there may be required as many cards as sufficient to provide a combination of overall kinds of informations. It is expensive and greatly troublesome to manufacture and manage such great many cards.

Accordance to the present invention, the discrimination card for a card reader is designed such that a single card may have a plural number of information codes which can be variably set up as desired.

It is therefore the general object of the present invention to provide a novel and useful discrimination card which has eliminated the above described disadvantages.

Another object of the invention is to provide a discrimination card which incorporates in a unit a plural number of information codes set up variably and thereby the cards in use can be reduced in the number.

Other object of the invention is to provide a discrimination card which cooperates with a card reader which can read a plural kinds of informations and has a single card insertion slot.

Further object of the invention is to provide a discrimination card having a construction that a plurality of card members respectively having different informations are connected detachably and replaceably so as to variably set up a combination of plural informations.

These and other objects and features of the invention will become apparent from the description as hereinafter set forth when read in conjunction with the accompanying drawings, in which.

Figure 1:
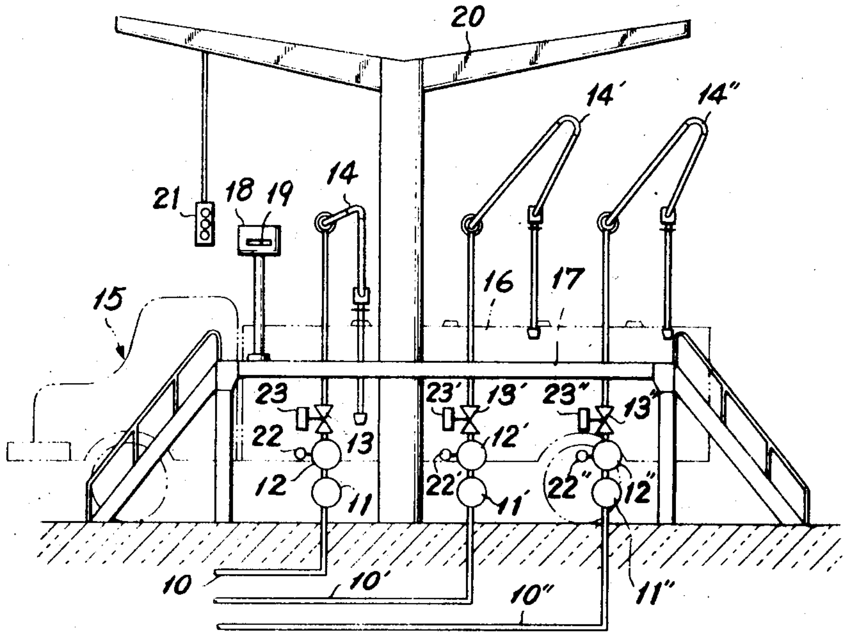
FIG. 1 is a side view of an embodiment of a fuel supply stage of a fuel supply apparatus provided with a card reader cooperating with a discrimination card according to the present invention.
Figure 2:
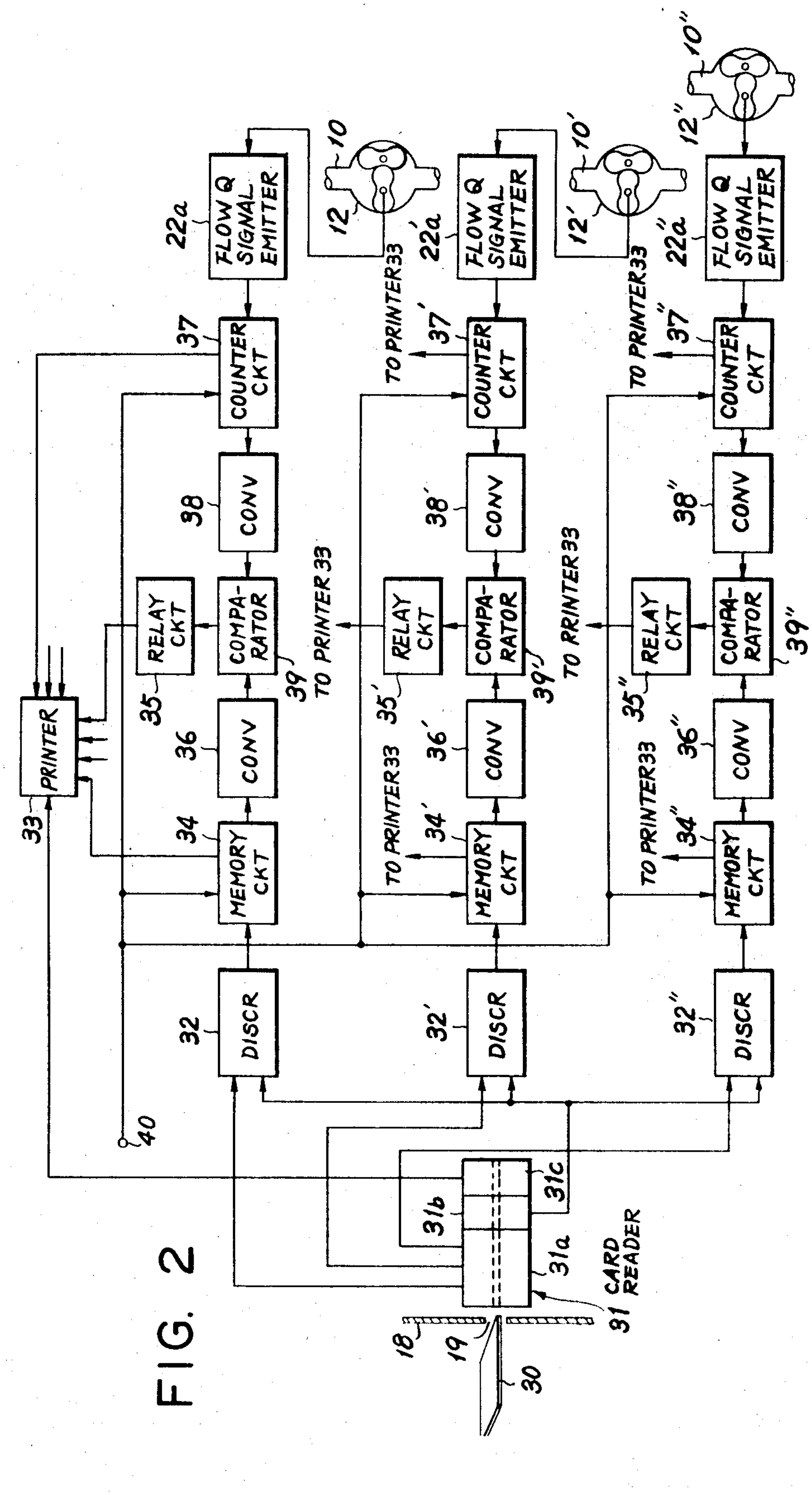
FIG. 2 is a schematic block diagram of an embodiment of the fuel supply apparatus.

Referring now to FIGS. 1 and 2, a fuel supply apparatus in use of a discrimination card according to the invention and a card reader cooperating therewith is illustrated.

In FIG. 1, a conduit pipe 10 is connected to a fuel reservoir (not shown) and extended to a location as predetermined. In the way of its extending on the ground the pipe 10 is provided with a pump 11, a flowmeter 12, and a fixed quantity valve 13. At the end of the pipe 10 is attached a swivel loading arm 14. There is provided a fuel supply stage 17 of a height that an operator can easily insert the loading arm 14 into a tank 16 of a tank lorry 15. A card reader 18 having a single card insertion slot 19 is mounted on the stage 17. From a ceiling 20 over the stage 17 is suspended a start switch 21 at a height free from obstacles during passing of the tank lorry 15 that the operator can efficiently operate the switch 21, which has a construction capable of preventing from the explosion, fire and like accidents caused by sparks and excessive currents during its operation.

The flowmeter 12 has a signal emission part 22 which includes a flow quantity signal emitter for emitting electrical pulse signals proportional to the quantity of flow through the pipe 10, and a fixed quantity signal emitter which operates by delivery of a predetermined quantity such as 1 kl. or 2 kl. and the like. The flow quantity signal emitter may either be of the microswitch type, contact type in use of reed switches, or non-contact type as of the photoelectric or high frequency signal emission type. The fixed quantity signal emitter may be of the construction having, for example, a notched disk and a microswitch which can emit a fixed quantity signal in each rotation of the notched disk. The fixed quantity valve 13 is provided with an electromagnetic solenoid 23 which is excited for causing the valve 13 to open and is deenergized for causing the valve 13 to close.

The first fuel supply system as herein provided includes the fuel reservoir, the pump 11, the flowmeter 12 with a signal emission part 22, the fixed quantity valve 13 which is opened or closed by an electromagnetic solenoid 23, and the loading arm 14. In the vicinity of the stage in parallel with the first fuel supply system are arranged second and third fuel supply systems for supplying the fuel of the sort different from that of the first system. Throughout the systems in the figure identical parts are denoted by identical numerals with one dash (') and two dashes ('') respectively. In the present embodiment are shown three fuel supply systems but the number of systems may be two or more than four if desired.

FIG. 2 is a block diagram showing an embodiment of the fuel supply apparatus. The card reader 18 contains a card reader part 31 therein which consists of reader parts 31*a* and 31*b*. The reader parts 31*a* and 31*b* read codes of a discrimination card 30 put in from the slot 19. The card 30 according to the invention has magnetic metal bits embedded in predetermined arrangements and forming codes corresponding to the quantity of fuel, the sort of fuel and the number of the tank lorry. The card 30 further may have other codes such as of the operator number as the case may require.

The reader parts 31*a*, 31*b* and 31*c* in the card reader 18 respectively comprise reed switches arranged over the card 30 in positions corresponding to the magnetic metal bits representing the quantity of fuel, the sort of fuel and the number of the tank lorry, and permanent magnets arranged below the card. The above described reed switches are interrupted of magnetic fluxes emitted from magnets, opened or closed when the metal bits of the card are provided between corresponding permanent magnets. Thus, according to opening or closing of the each reed switch the reader parts 31*a*, 31*b* and 31*c* will read the codes of the fuel quantity, the fuel sort and the number of the tank lorry respectively. The reader part 31 is not confined only to the type as mentioned above but it may be for example of a well-known high frequency oscillation type in which high frequency magnetic fields are modulated or oscillations of oscillatory coils are stopped by shielding of the metal bits of the card. In this case, the reader part of the transmitting type which has oscillating coils and receiving coils disposed at upper and lower sides of the slot or the reader part of the reflection type which has detection coils at one side of the slot and makes use of a reflection at the metal bits may be employed in the card reader.

The code of fuel quantity and that of fuel sort being respectively read by the reader parts 31*a* and 31*b* are fed respectively to fuel sort discriminating circuits 32, 32′ and 32″. The code of the number of the tank lorry read by the reader part 31*c* is fed to a printer 33. The fuel quantity codes may be represented by combination of numerals such as 1, 2, 4 and 8 and the fuel sort codes shown by alphabets, for example, A, B and C since according to the present embodiment the fuel supply systems are three in the number. Signals of the codes of fuel quantity and fuel sort are fed to AND circuits in the discriminating circuits 32, 32′ and 32″ from the reader parts 31*a* and 31*b*. The outputs of respective AND circuits are fed respectively to flip-flop circuits of memory circuits 34, 34′ and 34″. The output of the respective flip-flop circuits is respectively fed to binary-to-decimal conversion circuits 36, 36′ and 36″.

The flow quantity signals emitted from the flow quantity emitters 22*a*–22*a*″ of the signal emission parts 22–22″ provided at the flowmeters 12–12″ respectively corresponding to the flow quantity of fuel flowing through the pipes 10–10″ are counted respectively by counter circuits 37–37″. The results of counting are respectively fed to binary-to-decimal conversion circuits 38–38″ and the printer 33. The outputs of the binary-to-decimal code conversion circuits 36–36″ and 38–38″ are fed respectively to comparator circuits 39–39″, which will emit interlocking signals or coincidence signals when the outputs of the respective conversion circuits 36–36″ and 38–38″ are in coincidence and will actuate relay circuits 35–35″. The outputs of the relay circuits 35–35″ are fed to the printer 33. The printer 33 makes a printing operation upon finishing of fuel supply.

An operation of the apparatus of the described construction will now be illustrated.

Before operation, the electromagnetic solenoid 23 is in a state of nonoperation. The fixed quantity valve 13 is closed. Similarly, other fixed quantity valves 13′ and 13″ are also closed. In case fuel of sort A in 4 kl. and fuel of sort B in 3 kl. are to be supplied in the tank 16 of the tank lorry 15, a driver or an operator of the tank lorry 15 will be delivered at an office two sheets of discrimination cards which include a card 30*a* having a code of fuel sort A, a code of a quantity 4 kl. and a code of tank lorry number, and a card 30*b* having a code of fuel sort B, a code of a quantity 3 kl. and the same code of tank lorry number. When the operation of fuel supply is started the driver will insert two sheets of the cards 30*a*, 30*b* consecutively in and pull out of the card insertion slot 19 of the card reader 18.

When the card 30*a* is inserted in the slot 19, the code of fuel quantity 4 kl. which has been read by the reader part 31*a* is applied in this AND circuits of the fuel sort discriminating circuits 32, 32′ and 32″. The code of the fuel sort A which has been read by the reader part 31*b* is applied in the AND circuits of the discriminating circuits 32. And the code of the tank lorry number which has been read by the reader part 31*c* is applied to the printer 33. Accordingly, it results that only the AND circuit in the discriminating circuit 32 which is simultaneously applied two inputs produces an output and the code of 4 kl. drives the memory circuits 34 of the system of the fuel sort A and the code of 4 Kl. is stored and memorized in the circuit 34 after the card 30*a* has been taken out of the card reader 18.

After the card 30*a* has been taken out of the card reader 18 the card 30*b* may be inserted in the slot 19, whereby the code of fuel quantity 3 kl. read by the reader part 31*a* is applied in the AND circuits of the discriminating circuits 32, 32′, and 32″. The code of fuel sort B read by the reader part 31*b* is applied in the AND circuits of the discriminating circuit 32′. And the code of the tank lorry number read by the reader part 31*c* is applied to the printer 33. Therefore, only the AND circuits in the discriminating circuit 32′ which are respectively applied two inputs to produce a respective output. The code of fuel quantity 3 kl. drives the memory circuit 34′ of the system of fuel sort B and the output is memorized in the circuit 34′ after the card 30*b* has been taken out of the card reader 18.

After reading and memorizing of the codes of the cards 30*a* and 30*b*, the driver inserts the loading arm 14 of the fuel supply system of the fuel sort A into a hatch of the tank 16 of the tank lorry 15 and the loading arm 14′ of the fuel supply system of the fuel sort B into other hatch of the tank 16. The driver then will depress switches corresponding to the fuel supply systems of the fuel sorts A, B out of the start switch 21.

As the start switch 21 corresponding to the fuel sort A is closed by the depression, the electromagnetic solenoid 23 is closed to the power source and excited to open the fixed quantity valve 13. Similarly, by closing of the start switch corresponding to the fuel sort B, the electromagnetic solenoid 23′ is excited to open the fixed quantity valve 13′.

Thus, after opening of the fixed quantity valve 13, the fuel of the sort A in the reservoir is supplied in a chamber of the tank 16 of the tank lorry 15 consecutively through the pipe 10, the pump 11, the flowmeter 12, the fixed quantity valve 13 and the loading arm 14. There are then emitted flow quantity pulse signals from the flow quantity emitter 22*a* of the signal emission part 22 of the flowmeter 12 corresponding to the quantity of the fuel supplied in every instant, which signals are decimally counted by the counter circuit 37 and the conversion circuit 38 and thereafter is fed to the comparator 39. When the quantity of fuel flowing through the flowmeter 12 reaches the amount for example 1 kl. as previously set in the fixed quantity signal emitter of the flowmeter 12, the fixed quantity switch is opened for an instant. By opening of the fixed quantity switch, the electromagnetic solenoid 23 is deenergized so that the fixed quantity valve 13 is closed. Usually the tank 16 in the tank lorry 15 is partitioned into a plural number of chambers each having a capacity of 1 kl. or 2 kl. According to the embodiment, as the capacity of each partitioned chamber is settled to 1 kl., the fixed quantity of the fixed quantity signal emitter may be set at 1 kl.

After the fixed quantity valve 13 has been closed by supply of fuel in the amount of 1 kl. the loading arm 14 may be put into another hatch of chamber and the start switch 21 again will be closed. In the same manner the fixed quantity valve 13 will open to resume the fuel supply. If the fuel supply of 1 kl. is ended the valve 13 will close automatically. The supply of sort A fuel in 4 kl. in total is finished by successive repeating of transferring of the loading arm 14, fuel supply, and automatic valve closing.

By the fuel supply as above described, the flow quantity signals are sent to the comparator 39 which issues an interlocking signal when the valve of 4 k1. which has been memorized in the memory circuit 34 and fed to the comparator 39 through the conversion circuit 36 coincides with the value of 4 k1. supplied to the circuit 39 from the circuit 38. By the interlocking signal from the circuit 39, the relay circuit 35 is actuated to interlock the fuel supply system. After the supply of predetermined quantity of 4 k1., it it not probable that the fixed quantity valve 13 opens even though the start switch 21 might be closed erroneously or intentionally.

The fuel supply operation of the fuel supply system for sort B fuel is quite same as that of sort A fuel, in which after the fuel supply of 3 k1. the relay circuit 35' is actuated to interlock the fixed quantity valve 13' in a closed condition.

Embodiments of the discrimination card 30 according to the invention are illustrated with reference to FIG. 3 and the following other figures.

Figure 3A:
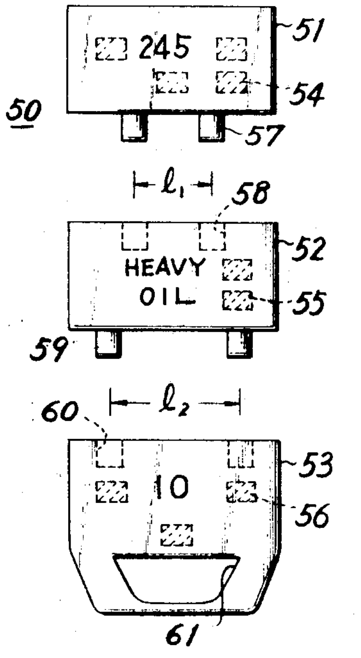
FIGS. 3A and 3B are plan views of an embodiment of a discrimination card according to the present invention respectively in detached and combined states.
Figure 3B:
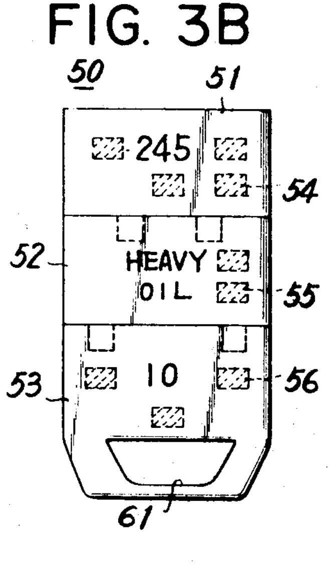

FIGS. 3A and 3B show a discrimination card 50 as a first embodiment of the discrimination card 30. The discrimination card 50 consists of first, second and third card members 51, 52 and 53 in separate forms. The card members 51 to 53 may preferably and respectively be made of nonmagnetic insulating material of untransparent synthetic resin. The first card member 51 has magnetic metal bits 54 embedded therein at places responsive to the code of the tank lorry number (No. "245" in this embodiment). Likewise, the second card member 52 has magnetic metal bits 55 embedded therein at places responsive to the code of the fuel sort ("heavy oil" in this embodiment), and the third card member 53 has magnetic metal bits 56 embedded therein at places responsive to the code of the fuel quantity ("10 kl." in this embodiment).

The card member 51 is provided with two projections 57 on one side face contacting the card member 52. An interval in a distance $l_1$ is provided between these two projections 57. At one side contacting the card member 51, the card member 52 has two recesses 58 with an interval $l_1$ therebetween. At the other side contacting the card member 53, the card member 52 has two projections 59 spaced apart with an interval $l_2$. The card member 53 is provided with two recesses 60 at an interval $l_2$ at one side contacting the card member 52. There is provided a recess 61 for gripping on the card member 53.

The projections 57 of the card member 51 fit to the recesses 58 of the card member 52 and the projections 59 of the card member 52 fit into the recesses 60 of the card member 53. Thus, the separated card members 51 to 53 shown in FIG. 3A can be engaged and combined in one discrimination card 50 of one cooperated body as shown in FIG. 3B. In the combination, intervals between projections 57 and 59 respectively provided on the card members 51 and 52 are different each other so that for instance the card member 51 may not connect to the card member 53. Each card member will not connect to other member in an erroneous arrangement. Thus, in the discrimination card 50 each code for the lorry number, fuel sort and fuel quantity can be arranged in right successive order from the forward end.

Herein, if the information that the discrimination card 50 contains will be changed, the card members 51 to 53 may be disengaged and disintegrated again as shown in FIG. 3A. If a new discrimination card is desired to be formed having information codes, for instance, of lorry number "245," "light oil," and "8 kl.," the card member 52 having the information code of "heavy oil" will be substituted for other new card member 52 having an information code of "light oil," and a card member 53 having the information code of "10 kl." will be substituted for other new card member 53 having an information of "8 kl." Thereafter, the card member 51 and new card members 52 and 53 will be engaged and combined in a predetermined arrangement in the same way as described. Thus, a new discrimination card 50 having desired information codes may be obtained.

According to the card of the present embodiment, the card members 51 to 53 are mutually detachable and replaceable. This expends less number of cards than in the prior art card incorporating all the informations in one solid card body.

Figure 4:
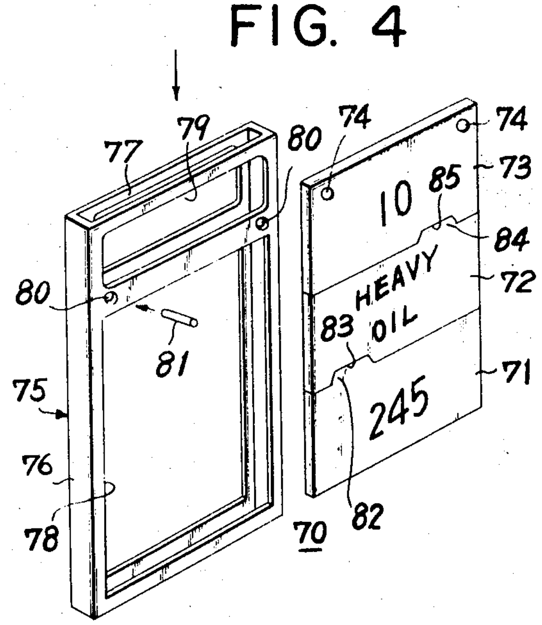
FIG. 4 is a perspective view of a second embodiment of a discrimination card according to the invention before it is assembled in a combination.

A discrimination card 70 as a second embodiment of the discrimination card according to the invention is now shown in FIG. 4. First, second and third card members 71, 72 and 73 are respectively made of nonmagnetic insulating material such as untransparent synthetic resin respectively of the same width. The card members 71 to 73 have respectively metal bits embedded therein in arrangements responsive to the information codes of lorry number, fuel sort and fuel quantity, respectively. At both corners of the card member 73 are formed pin insertion apertures 74. A frame body 75 comprises a support frame 76 holding the card members. The frame body 75 has a card member insertion opening 77, a large opening 78, an opening for gripping 79 and pin insertion apertures 80.

Card members 71 to 73 are arranged in the order as shown in the figure and inserted in the arrow direction from the insertion opening 77 into the frame body 75. The card members 71 to 73 are held by the support frame 76. At this instant, letters and figures displayed on the surfaces of the card members 71 to 73 can be observed through the opening 78. After the card members 71 to 73 have been inserted into the frame body 75 as described above, lock pins 81 are penetrated through the pin apertures 80 and 74. In consequence, the card members 71 to 73 are held by the support frame 76 and fixed by the lock pins 81 to thereby form one discrimination card 70.

When it is desired to vary the combination of information that each card member contains, the pins 81 are taken out and the card members 71 to 73 are taken out of the frame body 75. Card members responsive to the informations to be changed for are replaced by new card members so as to form a new combination of card members and to be fixed again in the frame body 75.

The card member 71 is provided with a projection 82 on a side contacting the card member 72. The card member 72 has a recess 83 on a side contacting the card member 71 and a projection 84 on a side contacting the card member 73. The card member 73 has a recess 85 on a side contacting the card member 72. The projections 82 and 84 are formed to fit respectively to recesses 83 and 85. These projections 82 and 84 are offset each other slightly sidewardly. As the result the card members 71 to 73 are solely arranged in the order as shown and do not fail in the order of arrangement. Therefore, the discrimination card 70 surely has the codes in the order of lorry number, fuel sort and fuel quantity.

In the present embodiment, similar to the preceding embodiment, the information codes can be desirably replaced and set up in a combination as distinguished from the conventional card which contains all information codes in one body thereby requiring preparation of so many cards having each combination of information codes respectively. Therefore the number of the card members to be prepared are greatly diminished.

Figure 5:
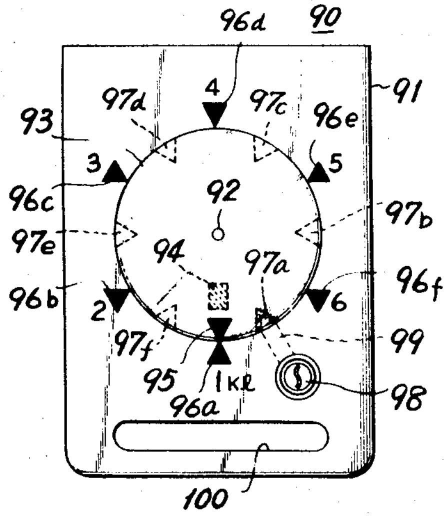
FIG. 5 is a plan view of a third embodiment of a discrimination card according to the invention.

FIG. 5 shows a discrimination card 90 proposed as a third embodiment of the discrimination card according to the invention. There is provided a rotary disk 93 revolvable about a shaft 92 on a solid board 91 of the card body. The rotary disk 93 has a metal bit 94 embedded in a position spaced apart from its center. An index 95 is provided on the peripheral edge of the rotary disk 93 at a place responsive to the metal bit 94. There are also provided indices 96*a*, 96*b*, - - - , 96*f* indicating the number, quantity or sort on the board along outside the rotary disk 93. Locking notches 97*a* - - - 97*f* are provided on the peripheral side surface of the rotary disk 93. A lock 98 is provided in the vicinity of the rotary disk 93 on the board 91. The lock 98 has a lever 99 to fit into the notches 97*a* to 97*f* of the rotary disk 93. The fixed board 91 is provided with a recess 100 for gripping.

In the position shown in the figure, the index 95 is positioned to meet the index 96*a* which indicates 1 kl. In this state, the rotary disk 93 is locked in the above described position by the lock 98.

Figure 6:
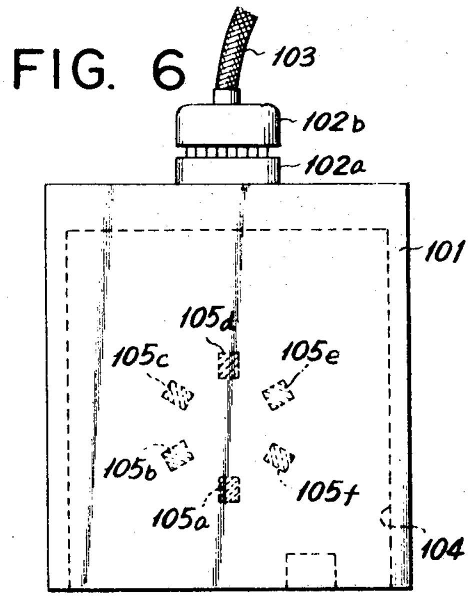
FIG. 6 is a diagrammatic plan view of an embodiment of a card reader cooperating with the discrimination card as shown in FIG. 5.

FIG. 6 shows a card reader which can read the information of the discrimination card 90. Reader casing 101 is connected to a connector 102*b* of a signal outgoing line 103 with its connector 102*a*. The casing 101 has a slot 104 into which the discrimination card 90 can be inserted. Code reading elements 105*a*, 105*b* --- 105*f* are respectively embedded in the casing 101 and on both upper and lower sides of the slot 104. The code reading elements 105*a* to 105*f* are disposed in a circular arrangement so as to meet the metal bit 94 of the rotary disk 93. The elements comprise nearby operation switch elements, reed switch elements, high frequency oscillatory elements and the like suitable reading elements.

In order to set up the information of the discrimination card 91 at another desired value, a key may be inserted into the lock 98. The locking engagement with the notch 97*a* is thus released through the lever 99 for revolving the rotary disk 93 as required. By revolution of the rotary disk 93 the index 95 is coincided with the index 96*c* of 3 kl. of a desired quantity. After that the rotary disk 93 is locked by the lock 98. When the discrimination card 90 in this state is inserted into the card reader 101, the metal bit 94 accords with the reading element 105*c*. Then, the code of 3 kl. is read by the reading element 105*c*.

Thus, the rotary disk 93 can be revolved appropriately and the informations to be read can be varied and set up at will. Therefore, the cards to be prepared are diminished in the number.

Figures 7, 8, 9:
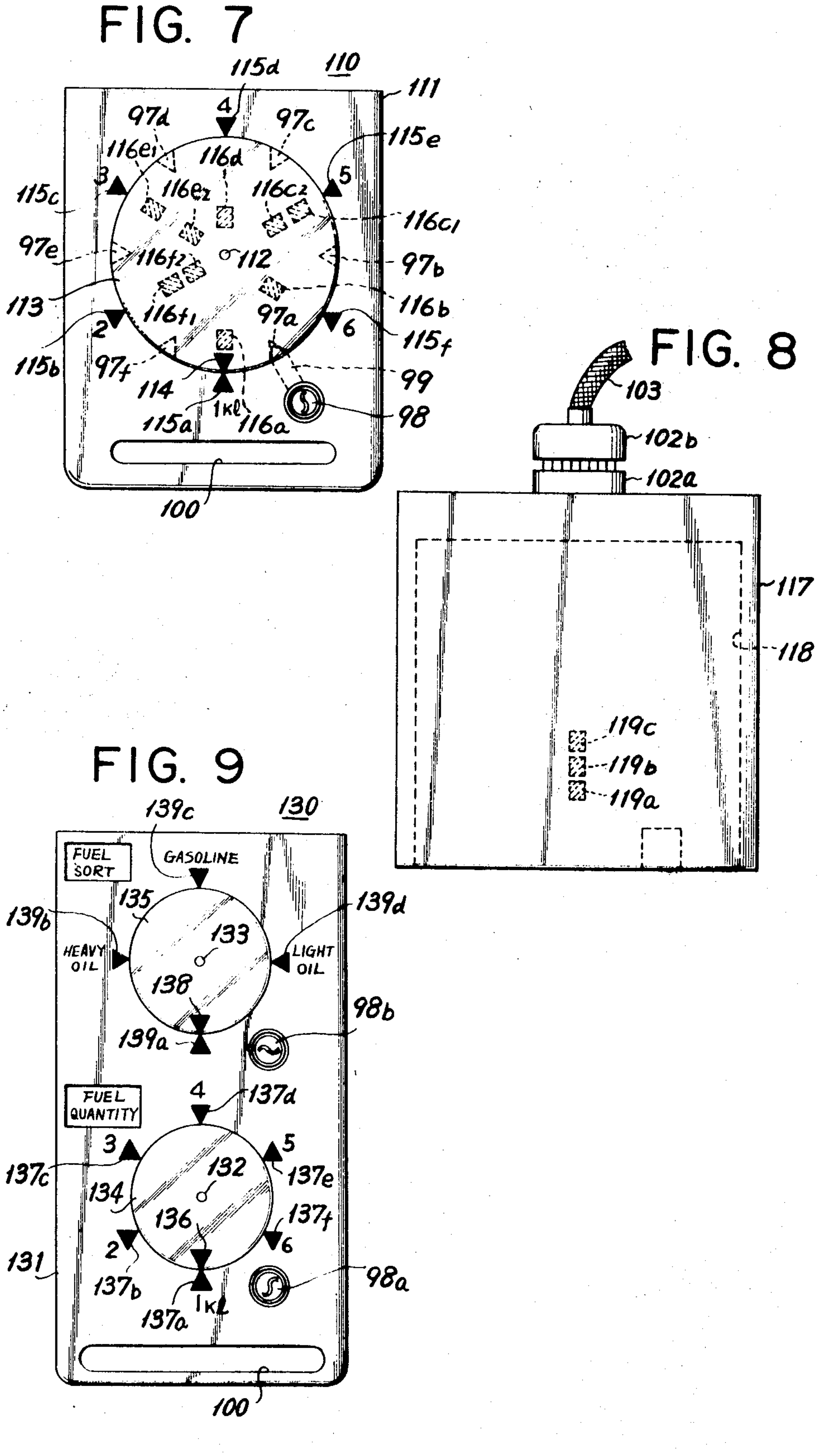
FIG. 7 is a plan view of a fourth embodiment of a discrimination card according to the invention.
FIG. 8 is a diagrammatic plan view of an embodiment of a card reader cooperating with the discrimination card as shown in FIG. 7.
FIG. 9 is a plan view of a fifth embodiment of a discrimination card according to the invention.

FIG. 7 shows a discrimination card 110 as a fourth embodiment of the discrimination card according to the invention. On the solid board 111 of the card body, there is provided a rotary disk 113 revolvable about a shaft 112. The rotary disk 113 is provided with a plurality of metal bits. The metal bits on the same radii from the shaft 112 represent the same codes. For example, arrangements of this radii are assumed as representing the codes "1," "2" and "4" from the exterior side to the interior of the radii. When an index 114 of the rotary disk 113 is in the position responsive to the index 115*a* showing 1 kl., the metal bit 116*a* in a predetermined position may be disposed to the outermost side representing the numerical value "1." When the index 114 is in a position responsive to the index 115*b* showing 2 kl., the metal bit 116*b* in a predetermined position is disposed to a second position from the exterior side to represent the value "2." In the similar manner, the metal bits 116$c_1$ and 116$c_2$ are arranged in code positions representing the numerical value "3," and similarly the metal bit 116*d* in a position representing the value "4," the metal bits 116$e_1$ and 116$e_2$ representing the value "5," and the metal bits 116$f_1$ and 116$f_2$ representing the value "6," respectively.

FIG. 8 shows a card reader for reading the information of the discrimination card 110. Reader casing 117 has a slot 118 into which the discrimination card 110 is inserted. Code reading elements 119*a*, 119*b* and 119*c* are embedded on the upper and lower sides of the slot 118 in the casing 117. The code reading elements 119*a* to 119*c* are disposed on a line at a position as predetermined. The elements 119*a* to 119*c* may consist of same elements as those elements 105*a* to 105*f* as described above.

When the information of the discrimination card 110 is set up at a desired value, a key is inserted into the lock 98 for unlocking. Then the rotary disk 113 may be revolved as required. By revolving the rotary disk 113, the index 114 is accorded to, for example, the index 115*c* showing 3 kl. of a After quantity. AFter that the rotary disk 113 is locked by the lock 98. When the discrimination card 111 in this state is inserted into the card reader 117, the metal bits 116$c_1$ and 116$c_2$ accord to the code reading elements 119*a* and 119*b*. Accordingly, outputs are taken from the code reading elements 119*a* and 119*b*. The code of 3 kl. is read by the reading elements 119*a* and 119*b*.

This embodiment requires more metal bits to be embedded in the rotary disk as compared with the preceding third embodiment. However, the code reading elements to be embedded in the card reader can be diminished in the number.

FIG. 9 shows a discrimination card 130 for a fifth embodiment of the discrimination card according to the invention. Rotary disks 134 and 135 are revolvably provided about shafts 132 and 133 on a solid board 131 of the card body. The rotary disk 134 is provided for setting up a fuel quantity information where one or more metal bits are embedded. Similarly, the rotary disk 135 is provided for setting up a fuel sort information, in which one or more metal bits are embedded. When the discrimination card 130 of this embodiment is incorporated by application of the card of the third embodiment as illustrated in FIG. 5, the rotary disks 134 and 135 may respectively be embedded with a single metal bit. The card reader then may be of a construction in which two sets of code reading elements of the card reader shown in FIG. 6 are provided in positions responsive to the rotary disks 134 and 135. Further, when the discrimination card 130 of this embodiment is incorporated in application of the card of the fourth embodiment as illustrated in FIG. 7, the rotary disks 134 and 135 may respectively be embedded a plurality of metal bits. The card reader then may be of a construction that two sets of code reading elements of the card reader as shown in FIG. 8 are provided at positions responsive to the rotary disks 134 and 135.

For setting up two informations which are contained in the discrimination card 130, as desired, keys are inserted respectively in the locks 98*a* and 98*b* to unlock so as to release the rotary disks 134 and 135 to be revolvable. For instance, when the fuel quantity is set up, for example, at "3 K*l*," the rotary disk 134 is revolved so that the index 136 is in accord with the index 137*c* showing "3 kl." In setting up the fuel sort, for example, at "gasoline," the rotary disk 135 may be revolved so as to accord to the index 139*c* of "gasoline." Thereafter, the locks 98*a* and 98*b* may be locked. When the discrimination card 130 in this state is inserted into the card reader, the information codes of "3 kl." and "gasoline" are read.

The described discrimination card 130 may be added with information of other kind. Then, another rotary disk may further be added and its information code may be set up variable. In the present embodiment, the two rotary disks 134 and 135 are provided on one solid board 131. These rotary disks 134 and 135 may be provided respectively on different two boards. Similar to the card members of the previous first and second embodiments illustrated together with FIGS. 3 and 4, the boards which have respectively rotary disk can be set up in one body incorporated in connection and combination.

In the above embodiments, the discrimination card of the invention is applied in the apparatus for supplying fuel to the tank lorry. However, the apparatus which is applied the discrimination card is not confined solely to the apparatus as described above. Moreover the discrimination card may be extensively employed in suitable card systems such as the systems for credit card, sales and collection card, admittance card, self service card and the like. In the above described embodiments, there are used metal bits as information memory elements arranged in compliance with the information code for the discrimination card. The application is not limited to those examples, however, but such metal bits may have certain notches or perforations as the case may require. Then, the card reader can use a means having a switch to open or close corresponding to such notches or perforations or a means for detecting the light passing through the perforations. Many other variations or modifications may also be made in the present invention so far as those will not depart from the spirit and scope of the invention.

What we claim is:

1. A discrimination card for a single card reader having a single card insertion slot and a plurality of reader parts capable of reading respectively the codes of the card, said card comprising a plurality of individual card members having each respectively different information codes, said card members having means for connection to contiguous card members in a predetermined arrangement, said means including said card members having a projection or recess on at least one side thereof adapted to fit with complementary recess or projection of an adjoining card member in said predetermined arrangement, and each said card member being replaceable with another similar card member having a similar type of code so as to provide a combination of card containing other information.

2. The discrimination card as claimed in claim 1, in which card members providing information of a varied type include complementary projections or recesses varying in their relative positions.

3. The discrimination card as claimed in claim 1, including a grip portion on at least one of said cards having a recess at one side thereof.

4. The discrimination card as claimed in claim 1, comprising a frame body housing, means for holding said card members connected to each other to form said card, and means for fastening said card in said frame body.

5. The discrimination card as claimed in claim 4, including a grip portion on said frame body having an opening at one side thereof.

* * * * *